United States Patent
Tiwari et al.

(10) Patent No.: US 12,185,269 B2
(45) Date of Patent: Dec. 31, 2024

(54) METHOD AND SYSTEM OF INDICATING SMS SUBSCRIPTION TO THE UE UPON CHANGE IN THE SMS SUBSCRIPTION IN A NETWORK

(71) Applicant: NEC Corporation, Tokyo (JP)

(72) Inventors: Kundan Tiwari, Tamil Nadu (IN); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/963,935

(22) PCT Filed: Jan. 31, 2019

(86) PCT No.: PCT/JP2019/003411
§ 371 (c)(1),
(2) Date: Jul. 22, 2020

(87) PCT Pub. No.: WO2020/003576
PCT Pub. Date: Jan. 2, 2020

(65) Prior Publication Data
US 2021/0360567 A1  Nov. 18, 2021

(30) Foreign Application Priority Data

Jun. 25, 2018  (IN) .............................. 201811023633

(51) Int. Cl.
*H04W 4/14* (2009.01)
*H04W 60/04* (2009.01)
*H04W 76/25* (2018.01)

(52) U.S. Cl.
CPC ............. *H04W 60/04* (2013.01); *H04W 4/14* (2013.01); *H04W 76/25* (2018.02)

(58) Field of Classification Search
CPC ....... H04W 60/04; H04W 4/14; H04W 76/25; H04W 48/02; H04W 8/205; H04W 12/08
See application file for complete search history.

(56) References Cited

U.S. PATENT DOCUMENTS

| 2017/0332217 | A1 | 11/2017 | Youtz et al. |
| 2019/0053308 | A1* | 2/2019 | Castellanos Zamora .................... H04L 65/1016 |
| 2019/0116486 | A1* | 4/2019 | Kim ......................... H04W 8/10 |
| 2019/0200285 | A1* | 6/2019 | Velev ....................... H04W 8/02 |
| 2019/0254094 | A1* | 8/2019 | Babu ...................... H04W 76/15 |

(Continued)

FOREIGN PATENT DOCUMENTS

| CN | 103581871 A | 2/2014 |
| CN | 103731808 A1 | 4/2014 |

(Continued)

OTHER PUBLICATIONS

Machine English translation of CN110392369 (Year: 2023).*

(Continued)

*Primary Examiner* — Peter P Chau

(57) ABSTRACT

The present disclosure provides a method and system wherein a network indicates to a UE that the UE is allowed to send SMS over NAS in a network initiated procedure in a case for SMS subscription change wherein when the UE has been registered to the 5GS after successful Registration procedure with the status that the UE cannot have the SMS over NAS service, as the UE has subscription data "SMS service is not allowed" in the UDM.

7 Claims, 7 Drawing Sheets

(56) References Cited

U.S. PATENT DOCUMENTS

| | | | | |
|---|---|---|---|---|
| 2019/0261185 | A1* | 8/2019 | Velev | H04W 48/18 |
| 2019/0268835 | A1* | 8/2019 | Shan | H04W 48/16 |
| 2020/0196130 | A1* | 6/2020 | Tamura | H04W 48/18 |
| 2020/0404734 | A1* | 12/2020 | Watfa | H04W 76/25 |
| 2020/0413241 | A1* | 12/2020 | Park | H04W 76/22 |
| 2021/0152984 | A1* | 5/2021 | Kaura | H04L 67/55 |
| 2021/0168571 | A1* | 6/2021 | Tang | H04W 8/02 |

FOREIGN PATENT DOCUMENTS

| | | |
|---|---|---|
| CN | 104221406 A1 | 12/2014 |
| CN | 104221410 A | 12/2014 |
| TW | 201613311 A | 4/2016 |

OTHER PUBLICATIONS

TS 23.501 V15.2.0 (Jun. 2018).
TS 23.502 V15.2.0 (Jun. 2018).
3GPP TR24.890 V15.1.0, Mar. 29, 2018.
InterDigital, Further corrections to SMS requested/allowed, 3GPP TSG-CT WG1 Meeting #111 C1-183319, May 14, 2018.
Ericsson, UE policies via UE configuration update procedure, 3GPP TSG-CT WG1 #106 C1-174170, Oct. 16, 2017.
Samsung R&D Institute UK, Change of "SMS allowed" in the AMF after registration, 3GPP TSG-CT WG1 Meeting #111bis C1-184030, Jul. 13, 2018.
Chinese Office Action for CN Application No. 201980011531.1 mailed on Jun. 24, 2021 with English Translation.
CATT, "Update for Registration procedure", 3GPP TSG-CT WG1 Meeting #110, C1-182386, Apr. 9, 2018, China.
Nokia et al., "Pseudo-CR on sublayers in L3:N1, 5GMM, 5GSM", 3GPP TSG-CT WG1 Meeting #103, C1-171912, Apr. 7, 2017, USA.
Extended European Search Report for EP Application No. EP19825751.1 dated on Feb. 1, 2021.
Ericsson: "Deregistration procedure for SMS over NAS", 3GPP Draft; S2-186127, 3GPP TSG-SA WG2 Meeting #127bis, Jun. 10, 2018, USA.
NEC: "Sms subscription Change", 3GPP Draft; S2-186746, 3GPP TSG-SA WG2 Meeting #128, Jun. 26, 2018, Lithuania.
Chinese Office Communication for CN Application No. 201980011531.1 mailed on Jan. 9, 2023 with English Translation.
JP Office Action for JP Application No. 2022-077403, mailed on Apr. 4, 2023 with English Translation.
Telecom Italia, Corrections on UE configuration update procedure, 3GPP TSG SA WG2 #127-BIS, S2-185019, Jun. 1, 2018.
3GPP TS 24.501 V1.2.1 (Jun. 2018), 3GPP, Jun. 8, 2018.
Huawei, HiSilicon, Clarifications on generic UE configuration update procedure, 3GPP TSG CT WG1 #108, C1-180296, Jan. 26, 2018.
Intel, Registration procedure to be used to register for SMS over NAS, 3GPP TSG CT WG1 #111, C1-183707, May 25, 2018.
3GPP TS 24.501 V15.0.0 (Jun. 2018), 3rd Generation Partnership Project; Technical Specification Group Core Network and Terminals; Non-Access-Stratum (NAS) protocol for 5G System (5GS); Stage 3 (Release 15), pp. 1-pp. 337.

* cited by examiner

METHOD AND SYSTEM OF INDICATING SMS SUBSCRIPTION TO THE UE UPON CHANGE IN THE SMS SUBSCRIPTION IN A NETWORK

This Application is a National Stage Entry, under 35 U.S.C. § 371, of International Application No. PCT/JP2019/003411, filed on Jan. 31, 2019, which claims priority from India patent application Ser. No. 201811023633, filed Jun. 25, 2018, the disclosures of which are incorporated herein by reference in their entireties.

TECHNICAL FIELD

The present disclosure relates to the method and system of indicating SMS subscription to the UE upon change in the SMS subscription in a network.

BACKGROUND ART

In the 3GPP standard specification for 5G system, the SMS is described as the optional service for communication. Therefore, an Access and Mobility Management Function (AMF) may subscribe to a Unified Data Management (UDM) about the subscriber data change notification. So whenever the subscriber data for the SMS service is changed in the UDM for a user and the changes affect the user profile in the AMF, the UDM shall notify these changes to the AMF by the means of invoking Nudm_SDM_UpdateNotification service operation. Then the AMF updates the user profile.

In other words, if the subscription for the SMS over Non-Access Stratum (NAS) service in the UDM is changed (e.g. from not allowed SMS over NAS to allowed SMS over NAS, from allowed SMS over NAS to not allowed SMS over NAS) for the user, then the UDM notifies this changes to the AMF.

In 3GPP specifications, specifically, Non Patent Literature 1 and Non Patent Literature 2, a SMS registration procedure for 5G System (5GS) has been disclosed wherein when the User Equipment (UE) wants to use SMS over NAS service (i.e. to send and receive SMS over NAS), the UE indicates it in NAS service capability i.e. "SMS supported" indication and sends it to the AMF during the Initial Registration procedure or during the re-registration procedure. The AMF retrieves the Subscription data from the UDM. The AMF on receiving the "SMS supported" indication further checks the SMS subscription of the UE. If the SMS subscription indicates that the SMS service is allowed for the UE, then the AMF selects a SMS Function (SMSF) for the UE and sends a request message (e.g. Nsmsf_SMServive_Activate_Request) to activate the SMS service for the user to the selected SMSF. After the SMSF discovers a UDM for the UE, the SMSF then registers itself for the UE for the SMS service in the UDM for the access type (e.g. 3GPP access or non-3GPP access) on which the UE has initiated initial registration or re-registration procedure. The SMSF gets the UE SMS subscription data and SMS management subscription data from the UDM. The SMSF also sends a response message (e.g. Nsmsf_SMServive_Activate_Response) to the AMF indicating that the SMS service is successfully activated for the UE. The AMF sends the Registration Accept message to the UE indicating that the UE is allowed for SMS over NAS.

After this procedure has been completed successfully, the UE is able to transmit SMS over NAS to the network on request from upper layer to transmit SMS over NAS or receive SMS over NAS from the network. The "SMS support" indication is the UE capability to transmit or receive SMS message over 3GPP access network or non-3GPP access network with the 5G Core Network (5GC).

CITATION LIST

Non Patent Literature

NPL 1: TS23.501 V15.2.0 (2018-6)
NPL 2: TS23.502 V15.2.0 (2018-6)

SUMMARY OF INVENTION

Technical Problem

However, the procedure as disclosed in the 3GPP specification creates following two issues The first issue may be occurred when the UE indicates the "SMS support" indication to the AMF in the registration procedure to request the AMF to register for the SMS over NAS service. The AMF checks whether the UE is subscribed for SMS over NAS service. If the UE is not subscribed for the SMS over NAS service then the AMF indicates to the UE that SMS over NAS service is not allowed for the UE. The UE will not send any SMS over NAS afterwards.

After the UE has been registered to the AMF without the SMS over NAS service, the UE may subscribe to the SMS over NAS service by updating UE's subscription profile in the UDM. In this scenario, the UDM will notify the registered AMF that UE is subscribed to the SMS over NAS service. However, in the current 3GPP standard specification, the AMF has no way to indicate the UE that UE is now subscribed to the SMS over NAS and able to have the SMS over NAS service. As the AMF cannot indicate the subscription updates to the UE, the UE will not be able to send the SMS over NAS service even though the SMS over NAS service is now subscribed for the UE. The Network will also not be able to send SMS over NAS to the UE since the AMF knows that UE has not yet notified that the SMS over NAS service is allowed.

Another issue may be occurred when the UE indicates the "SMS support" indication to the AMF in the registration procedure to request the AMF to register for the SMS over NAS service. The AMF checks whether the UE is subscribed for SMS over NAS service or not. If the SMS over NAS is allowed for the UE then the AMF indicates to the UE in registration procedure that the SMS over NAS is allowed. When the SMS subscription has been withdrawn for the UE then the network has no procedure to indicate the UE that the SMS over NAS is not allowed any longer.

Therefore, even if the UE will send the SMS over NAS, the network will drop the SMS. This will increase unnecessary signalling to the network. Also the MT SMS comes to the AMF and AMF needs to report that MT SMS is not allowed to the SMSF which in return indicates to the Gateway Mobile Services Switching Center (GMSC) that SMS is not allowed. This may causes signalling increase in the 5GC. Therefore, there is a need for solving the problems mentioned above by providing an effective method and system indicating SMS subscription to the UE upon change in the SMS subscription in a network.

Solution to Problem

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

In order to overcome at least the problems as discussed above, the present disclosure provides solutions wherein in one aspect, a network indicates to a UE that the UE is allowed to send SMS over NAS in a network initiated procedure in a case for SMS subscription change wherein when the UE has been registered to the 5GS after successful Registration procedure with the status that the UE cannot have the SMS over NAS service, as the UE has subscription data "SMS service is not allowed" in the UDM. The AMF may keep an "SMS Request" indication status that the UE sent to the AMF in the Registration Request message during the last initial registration procedure, registration update procedure or periodic update procedure. The "SMS Request" indication status is either the UE has indicated "SMS Request" or not. Further, in UDM, the SMS subscription for the UE changes from "SMS service is not allowed" to "SMS service is allowed". After the SMS subscription change from "not allowed" to "allowed", the AMF receives a message (e.g. Nudm_SDM_Notification message) from the UDM indicating that SMS over NAS is allowed for the UE. Further, the AMF invokes an Nsmsf_SMService_Activate service operation to SMSF to activate the SMS over NAS for the UE. The SMSF invokes Nudm_UECM_Registration and Nudm_SDM_Get service operation to the UDM to register the UE for the SMS service in the UDM. The SMSF gets, according to the Nudm_SDM_Get service operation, SMS management subscription data. The UDM indicates to the SMSF that the UE is registered successfully in the UDM. The SMSF gets the SMS management data from the UDM. After this the SMSF sends a message to the AMF indicating the SMS service is activated. Accordingly, the AMF now sends a NAS message (e.g. Configuration Update Command) containing an information element indicating SMS over NAS is allowed. The AMF optionally include an indication requesting the UE to acknowledge the received NAS message by sending a NAS message (e.g. Configuration Update Complete). Further, upon receiving the NAS message the UE may sends a response NAS message (e.g. Configuration Update Complete). Therefore, after receiving the SMS over NAS allowed indication, the UE determines (considers) that the UE is allowed to send SMS over NAS to the network.

In another aspect, the present disclosure provides solutions wherein a network indicates that the UE has been registered to the 5GS after successful Registration procedure with the status that the UE cannot have the SMS over NAS service as the UE has subscription data "SMS service is not allowed" in the USM. At this point of time, the AMF may keep an "SMS Request" indication status that the UE sent to the AMF in the Registration Request message during the last initial registration procedure, registration update procedure or periodic update procedure. The "SMS Request" indication status is either the UE has indicated "SMS Request" or not. Further, in UDM, the SMS subscription for the UE changes from "SMS service is not allowed" to "SMS service is allowed". After the SMS subscription change from "not allowed" to "allowed", the AMF receives a message (e.g. Nudm_SDM_Notification message) from the UDM indicating that SMS over NAS is allowed for the UE. Accordingly, the AMF sends a (e.g. NAS message Configuration Update Command) to the UE indicating that the "SMS allowed" indication and an indication (e.g. "Registration Requested") to perform the registration procedure and the UE after receiving the Configuration Update Command containing "SMS allowed" indication and "registration request" indication sends Configuration Update Complete. After sending the Configuration Update Complete message to the AMF, the UE initiates the Registration procedure as described in the FIG. 1.

In an embodiment of the present disclosure, there is provided a method for a User Equipment (UE) wherein the method comprises of receiving, from an Access and Mobility Management Function (AMF), a Registration Accept message including a Short Message Service (SMS) subscription indication that indicates whether SMS over Non Access Stratum (NAS) is allowed for the UE, and receiving, from the AMF, a NAS message including changed SMS subscription indication in a case where change of the SMS subscription has been occurred, wherein the change of the SMS subscription indicates that the SMS subscription is changed from allowed to not allowed for the UE, or from not allowed to allowed for the UE.

The SMS subscription indication included in the Registration Accept message indicates that the SMS over NAS is not allowed for the UE wherein the changed SMS subscription indication included in the NAS message indicates that the SMS over NAS is allowed for the UE and the change of the SMS subscription indicates that the SMS subscription is changed from not allowed to allowed for the UE, wherein starting the SMS over NAS upon reception of the changed SMS subscription indication indicates that the SMS over NAS is allowed for the UE. The SMS subscription indication included in the Registration Accept message indicates that the SMS over NAS is allowed for the UE and the changed SMS subscription indication included in the NAS message indicates that the SMS over NAS is not allowed for the UE. The change of the SMS subscription also indicates that the SMS subscription is changed from allowed to not allowed for the UE, wherein stopping the SMS over NAS upon reception of the changed SMS subscription indication indicating that the SMS over NAS is not allowed for the UE.

Further, the AMF performs an SMS Function (SMSF) selection and initiates SMS service activation towards the selected SMSF in the case where the change of the SMS subscription has been occurred, wherein the activated SMS service includes at least one of discovery of Unified Data Management (UDM), register of serving Network Function (NF) for the UE on the UDM, the NF being the AMF or the SMSF, register of the UE for the SMS service on the UDM; and provision at least one of SMS management subscription data or SMS subscription data to the SMF.

The first NAS message includes an information element indicating to perform a registration procedure between the UE and the AMF by initiating the registration procedure with the AMF based on the information element indicating to perform the registration procedure.

In an embodiment of the present disclosure, there is provided a method for an Access and Mobility Management Function (AMF), the method comprises transmitting, to a User Equipment (UE), a Registration Accept message including a Short Message Service (SMS) subscription indication that indicates whether SMS over Non Access Stratum (NAS) is allowed for the UE, transmitting, to the UE, a NAS message including changed SMS subscription indication in a case where change of the SMS subscription has been occurred wherein the change of the SMS subscription indicates that the SMS subscription is changed from allowed to not allowed for the UE, or from not allowed to allowed for the UE. The SMS subscription indication included in the Registration Accept message indicates that the SMS over NAS is not allowed for the UE. Also the changed SMS subscription indication included in the NAS message indicates that the SMS over NAS is allowed for the UE and the change of the SMS subscription indicates that the SMS subscription is changed from not allowed to allowed for the UE. The SMS subscription indication included in the Registration Accept message indicates that the SMS over NAS is allowed for the UE. Further, the changed SMS subscription indication included in the NAS message indicates that the SMS over NAS is not allowed for the UE and the change of the SMS subscription indicates that the SMS subscription is changed from allowed to not allowed for the UE. The present disclosure further performs a SMS Function (SMSF) selection and initiating SMS service activation towards the selected SMSF, in the case where the change of the SMS subscription has been occurred, wherein the activated SMS service includes at least one of discovery of Unified Data Management (UDM), register of serving Network Function (NF) for the UE on the UDM, the NF being the AMF or the SMSF, register of the UE for the SMS service on the UDM, and provision at least one of SMS management subscription data or the SMS subscription data to the SMF. The first NAS message includes an information element indicating to perform a registration procedure between the UE and the AMF by performing the registration procedure by the UE and the AMF based on the information element indicating to perform the registration procedure.

In an embodiment of the present disclosure, there is provided a User Equipment (UE) comprises a transceiver and a processor configured to control the transceiver to receive, from an Access and Mobility Management Function (AMF), a Registration Accept message including a Short Message Service (SMS) subscription indication that indicates whether SMS over Non Access Stratum (NAS) is allowed for the UE, and receive, from the AMF, a NAS message including changed SMS subscription indication in a case where change of the SMS subscription has been occurred wherein the change of the SMS subscription indicates that the SMS subscription is changed from allowed to not allowed for the UE, or from not allowed to allowed for the UE.

In another embodiment of the present disclosure, there is provided an Access and Mobility Management Function (AMF) comprises of a transceiver and a processor configured to control the transceiver to transmit, to a User Equipment (UE), a Registration Accept message including a Short Message Service (SMS) subscription indication that indicates whether SMS over Non Access Stratum (NAS) is allowed for the UE, and transmit, to the UE, a NAS message including changed SMS subscription indication in a case where change of the SMS subscription has been occurred wherein the change of the SMS subscription indicates that the SMS subscription is changed from allowed to not allowed for the UE, or from not allowed to allowed for the UE.

BRIEF DESCRIPTION OF DRAWINGS

The foregoing and further objects, features and advantages of the present subject matter will become apparent from the following description of embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DESCRIPTION OF EMBODIMENTS

Figure 1:
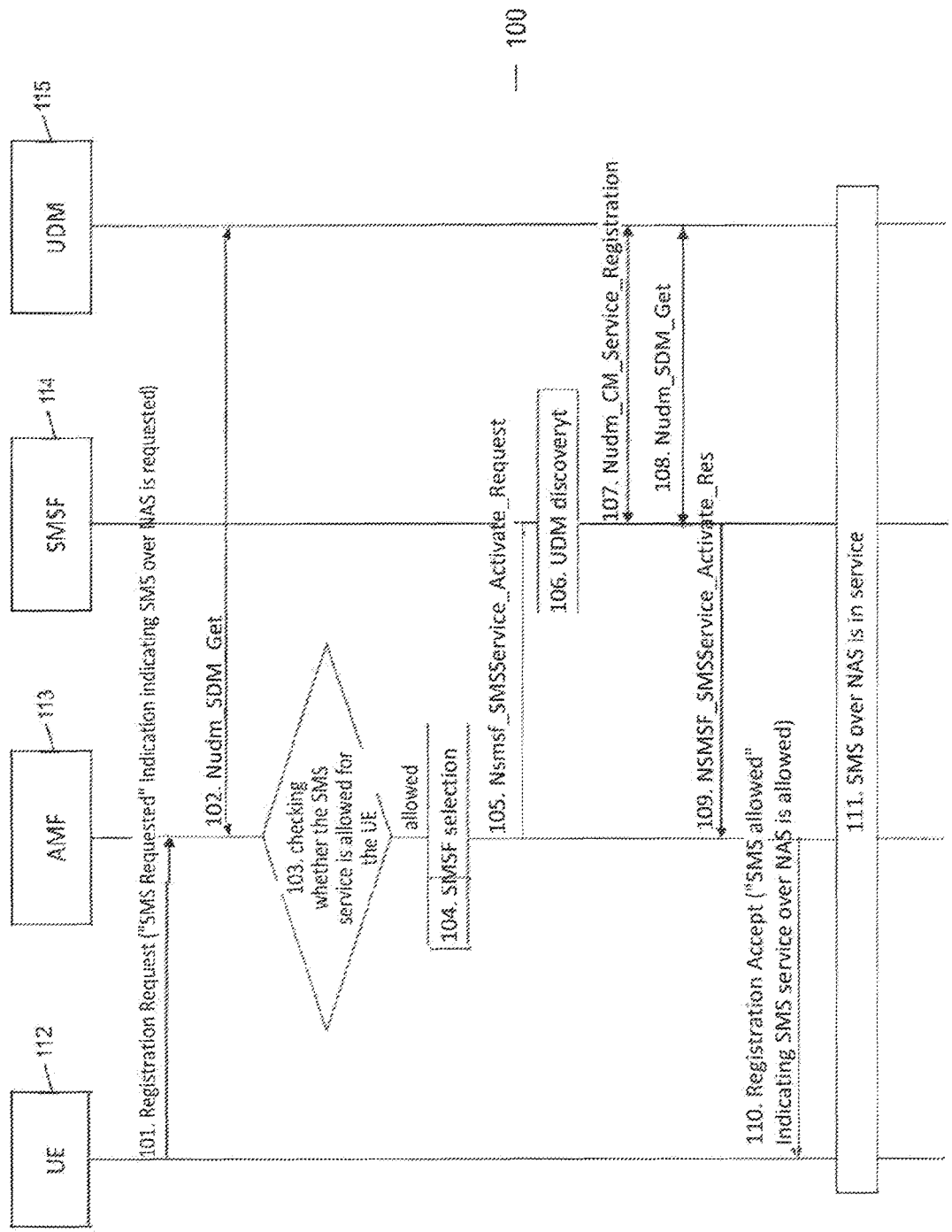
FIG. 1 illustrates SMS registration procedure for 5GS as per 3GPP specification.

Embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

Figure 2:
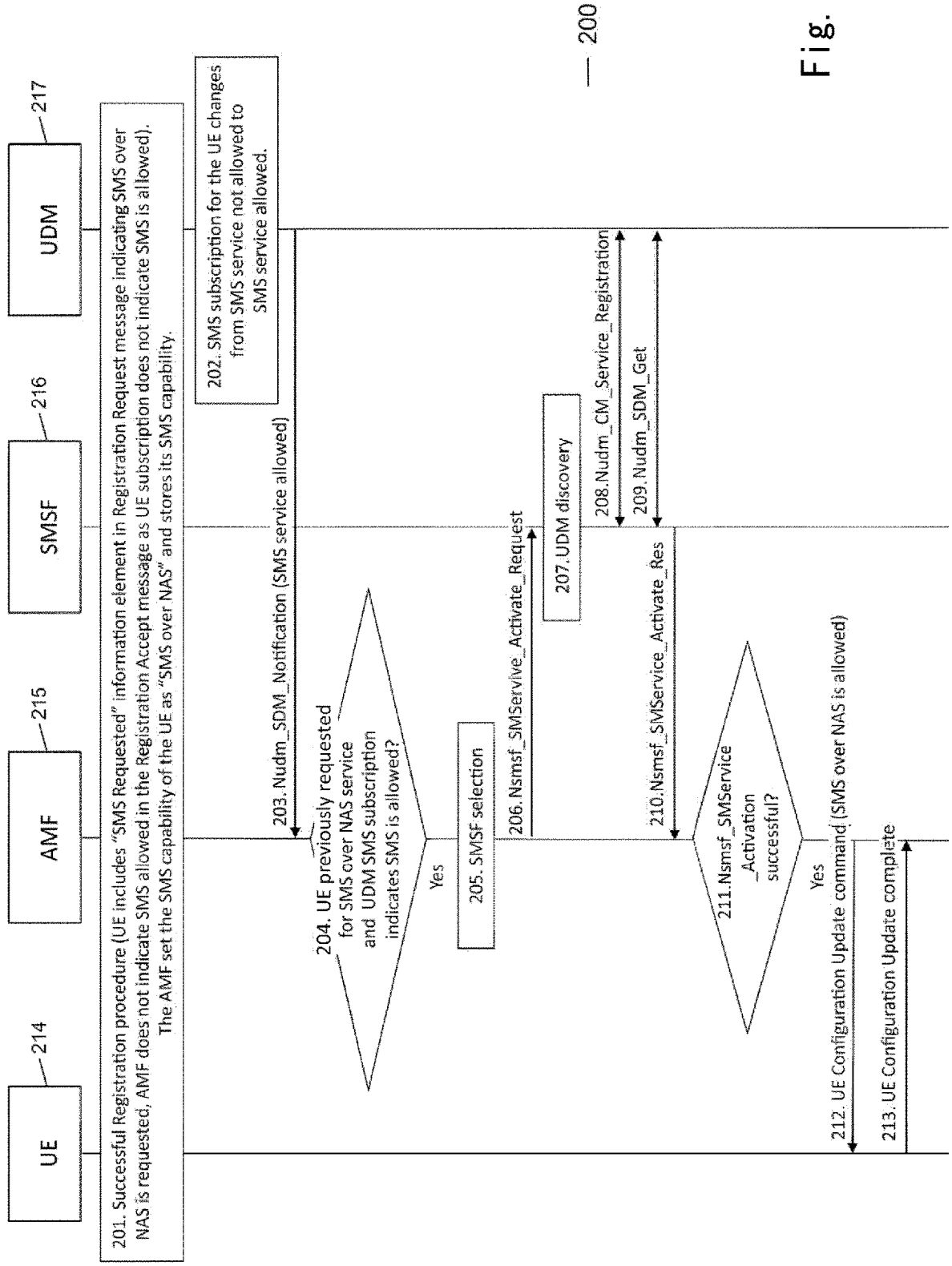
FIG. 2 illustrates a procedure to activate SMS service for the UE with the present disclosure.

In an embodiment of the present disclosure as shown in FIG. 2, the detailed steps to activate the SMS service are described. As shown in step (201), the UE (214) has been registered to the 5GS after successful Registration procedure. The UE (214) indicates "SMS Requested" Information element indicating to the AMF (215) that UE (214) is required to use SMS over NAS in the Registration Request message. The AMF (215) determines (considers) that UE (214) supports SMS over NAS and stores this capability in the AMF (215) and also store the information that UE (214) has requested NAS over SMS service. The AMF (215) further checks in the UE (214) subscription if the UE (214) is allowed for SMS over NAS service. The AMF (215) after determining that the UE SMS over NAS delivery is not allowed for the UE, the AMF (215) sends Registration Accept message in response of Registration Request message. The "SMS allowed" Information Element (IE) is specified in the 3GPP standard. Therefore, the Registration Accept message does not indicate that SMS over NAS is allowed either by not including the "SMS Allowed" IE or including the "SMS Allowed" IE indicating SMS over NAS is not allowed, e.g. by including the "SMS Allowed" IE into which the "SMS over NAS is not allowed" is set. Upon receiving the Registration Accept message without "SMS allowed" IE or with "SMS allowed" IE indicating SMS over NAS is not supported, the UE (214) determines (considers) that the SMS over NAS is not allowed for the UE. In addition to or instead of the "SMS Requested", the UE (214) may indicate "SMS Supported". The indication of "SMS Requested" or "SMS Supported" may be sent to AMF (215) using a NAS message. In addition to or instead of the NAS message, the indication of "SMS Requested" or "SMS Supported" may be sent to AMF using an AS message and NGAP message with transferring at the RAN node (e.g. NG RAN, gNB).

At (202), the UE subscription profile is changed in the UDM/UDR from "SMS over NAS is not allowed" to "SMS over NAS is allowed". For example, the UE (e.g. smart meter, sensor node) performing the Internet of Things (IoT) function (e.g. Bandwidth reduced Low complexity, Coverage Enhancement or Narrow Band (NB)-IoT) may not need the SMS service. Therefore, the SMS subscription change (e.g. change from "SMS over NAS is not allowed" to "SMS over NAS is allowed") may be occurred when the IoT function capable UE switches itself or is switched from UE in the IoT function mode to UE in normal operation mode. However, it is not limited that the SMS subscription change is happened at only the above situation.

At (203), the UDM (217) sends a message (e.g. Nudm_SDM_Notification message) to the AMF (215) indicating that SMS over NAS is allowed for the UE.

As shown at (204), the AMF (215) checks whether the UE (214) supports SMS over NAS by checking the UE SMS over NAS capability at (201), and whether the "SMS Request" indication status that the UE (214) sent to the AMF (215) in the Registration Request message during the last registration procedure and whether SMS over NAS subscription is changed from not allowed to allowed in the UDM (217) by comparing the previous SMS over NAS subscription in the AMF and new SMS over NAS subscription received in (203).

When all conditions are met, i.e. UE supports SMS over NAS and the UE has indicated the "SMS Request" and the SMS over NAS subscription has been updated to "SMS over NAS is allowed", further steps as shown in FIG. 2. (205 to 213) are executed. Otherwise, no further step is taken. Further as shown in FIG. 2, the AMF performs the SMSF selection and at (206) the AMF invokes Nsmsf_SMService_Activate service operation from the SMSF. This service allows AMF to authorize SMS and activate SMS for the served user on SMSF. At (207) the SMSF discovers a UDM. At (208), the SMSF invokes Nudm_UECM_Registration service operation from the UDM and registers the UE for the SMS service in the UDM. The Nudm_UECM_Registration service operation includes register UE's serving NF (if NF Type is AMF, SMSF) on the UDM. At (209), the SMSF invokes the Nudm_SDM_Get service operation to the UDM to get SMS management subscription data. The UDM indicates to the SMSF that the UE is registered successfully in the UDM. The SMSF gets the SMS Management data from the UDM. At (210), the SMSF sends the Nsmsf_SMService_Activate service operation response message to the AMF. The AMF stores the SMSF address received as part of the UE context and at (211), the AMF checks whether the Nsmsf_SMService_Activate service operation, i.e. steps (206) to step (210), is successful or not. At (212), if the Nsmsf_SMService_Activate service operation is successful, then the AMF takes either, depending upon CM status in the AMF, the following procedure:

If the UE is in CM-CONNECTED state (i.e. if the N1 signaling connection has been established between the UE and the AMF) then the AMF sends a first NAS message (e.g. Configuration Update Command message) including an "SMS supported" indication indicating that the UE is allowed for SMS over NAS service. The AMF optionally include, an indicator indicating the UE to send a second NAS message (e.g. Configuration Update Complete message) in response of the first NAS message (e.g. Configuration Update Command message). The UE on receiving SMS over NAS is allowed indication determines that the SMS over NAS service is allowed for the UE. The first NAS message may be also sent to the UE using an AS message and NGAP message with transferring at the RAN node (e.g. NG RAN, gNB); or If the UE is in CM-IDLE mode the AMF will initiate network initiated service request procedure. After the NAS signaling connection is established, the UE will send the NAS message and executes the procedure as described above.

At (213), the UE after receiving the first NAS message (e.g. Configuration Update Command) responds with the second NAS message (e.g. Configuration Update Complete) acknowledging the receipt of the first NAS message. Accordingly, after completion of steps 201 to 213, the UE is able to have the SMS over NAS service, i.e. the UE may start the SMS over NAS service.

In an embodiment of the present disclosure, the UE has been registered to the 5GS after successful Registration procedure with the status that the UE cannot have the SMS over NAS service as the UE has subscription data "SMS service is not allowed" in the UDM. At this point of time, the AMF may keep an "SMS Request" indication status that the UE sent to the AMF in the Registration Request message during the last initial registration procedure, registration update procedure or periodic update procedure. The "SMS Request" indication status is either the UE has indicated "SMS Request" or not. In UDM, the SMS subscription for the UE changes from "SMS service is not allowed" to "SMS service is allowed". After the SMS subscription change from "not allowed" to "allowed", the AMF receives a message (e.g. Nudm_SDM_Notification message) from the UDM indicating that SMS over NAS is allowed for the UE. The AMF sends a (e.g. NAS message Configuration Update Command) to the UE indicating that the "SMS allowed" indication and an indication (e.g. "Registration Requested") to perform the registration procedure which may include the registration update. The UE after receiving the Configuration Update Command containing "SMS allowed" indication and "registration request" indication sends Configuration Update Complete. After sending the Configuration Update Complete message to the AMF, the UE initiates the Registration procedure as described in FIG. 1.

Figure 3:
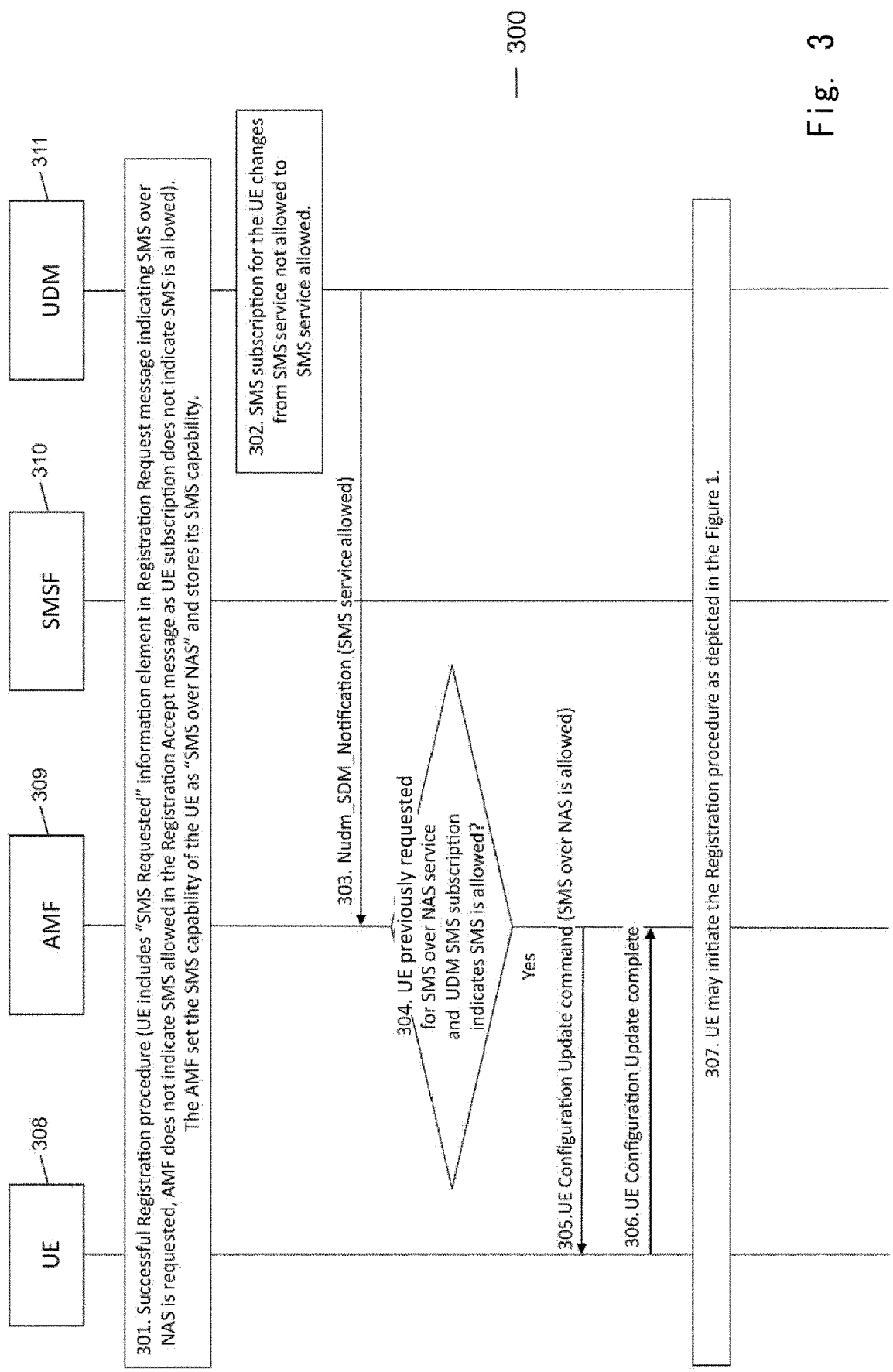
FIG. 3 illustrates another procedure to activate SMS service for the UE with the present disclosure.

In an embodiment of the present disclosure as shown in FIG. 3, the detailed steps to activate the SMS service are described wherein at (301), the UE (308) has been registered to the 5GS after successful Registration procedure. The UE has indicated "SMS Requested" Information element indicating to the AMF (309) that UE is required to use SMS over NAS in the Registration Request message. The AMF (309) determines that UE supports SMS over NAS and stores this capability in the AMF and also store the information that UE has requested NAS over SMS service. The AMF (309) further checks in the UE subscription if the UE is allowed for SMS over NAS service. The AMF after determining that the UE SMS over NAS delivery is not allowed for the UE, the AMF sends Registration Accept message in response of Registration Request message. The Registration Accept message does not indicate that SMS over NAS is allowed either by not including the "SMS Allowed" Information Element or including the "SMS Allowed" information element indicating SMS over NAS is not allowed, e.g. by including the "SMS Allowed" IE into which the "SMS over NAS is not allowed" is set. Upon receiving the Registration Accept message without "SMS allowed" IE or with "SMS allowed" IE indicating SMS over NAS is not supported the UE determines that the SMS over NAS is not allowed for the UE. In addition to or instead of the "SMS Requested", the UE may indicate "SMS Supported". The indication of "SMS Requested" or "SMS Supported" may be sent to AMF using a NAS message. In addition to or instead of the NAS message, the indication of "SMS Requested" or "SMS Supported" may be sent to AMF using an AS message and NGAP message with transferring at the RAN node (e.g. NG RAN, gNB). As shown, at (302), the UE subscription profile is changed in the UDM/UDR (311) from "SMS over NAS is not allowed" to "SMS over NAS is allowed". At (303), the UDM sends a message (e.g. Nudm_SDM_Notification message) to the AMF indicating that SMS over NAS is allowed for the UE. For example, the UE (e.g. smart meter, sensor node) performing the Internet of Things (IoT) function (Bandwidth reduced Low complexity, Coverage Enhancement or NB-IoT) may not need the SMS service. Therefore, the SMS subscription change may be occurred when the IoT function capable UE switches itself from UE in the IoT function mode to UE in normal operation mode. However, it is not limited that the SMS subscription change is happened at only the above situation.

Further, as shown at (304), the AMF checks whether the UE supports SMS over NAS by checking the UE SMS over NAS capability in the step (301), and whether the "SMS Request" indication status that the UE sent to the AMF in the Registration Request message during the last registration procedure and whether SMS over NAS subscription is changed from not allowed to allowed in the UDM by comparing the previous SMS over NAS subscription in the AMF and new SMS over NAS subscription received in the step (303). If all conditions are met, i.e. UE supports SMS over NAS and the UE has indicated the "SMS Request" and the SMS over NAS subscription has been updated to "SMS over NAS is allowed". The step as shown at (305 to 307) are executed. Otherwise, no further step is taken. The AMF may take either, depending upon CM status in the AMF, the following procedures:

If the UE is in CM-CONNECTED state (i.e. if the N1 signaling connection has been established between the UE and the AMF) then the AMF (309) sends a first NAS message (e.g. Configuration Update Command message) including an "SMS supported" indication indicating that the UE is allowed for SMS over NAS service and another information element indicating to perform the mobility registration update procedure (e.g. Registration requested (RED) value bit is set to "registration requested" in Configuration update indication IE of the Configuration Update Command). The AMF (309) optionally include an indicator indicating the UE (308) to send a second NAS message (e.g. Configuration Update Complete message) in response of the first NAS message (e.g. Configuration Update Command message). The UE on receiving SMS over NAS is allowed indication determines that the SMS over NAS service is allowed for the UE; or If the UE is in CM-IDLE mode, the AMF will initiate network initiated service request procedure. After the NAS signaling connection is established, the UE will send the NAS message and executes the procedure mentioned above.

At (306), the UE after receiving the first NAS message (e.g. Configuration Update Command) responds with the second NAS message (e.g. Configuration Update Complete) acknowledging the receipt of the first NAS message and at (307), the UE initiates the Registration procedure as described in FIG. 1 if the information element indicating to perform the mobility registration update procedure was included in the first NAS message (e.g. the UE initiates Registration procedure if Registration requested (RED) value bit is set to "registration requested" in Configuration update indication IE of the Configuration Update Command message)). Therefore, after completion of the procedure as shown from (301 to 307), the UE is able to have the SMS over NAS service i.e. the UE may start the SMS over NAS service.

In an embodiment of the present disclosure, the UE has been registered for the SMS over NAS service in the network successfully and the AMF has UE subscription indicating SMS over NAS service is allowed. The SMS over NAS subscription in the UDM/UDR for the UE is changed from SMS over NAS is allowed to SMS over NAS is not allowed. The UDM notifies to the AMF that UE is not allowed for SMS over NAS service by invoking service operation Nudm_SDM_Notification. Upon receiving the notification from the network that SMS over NAS service is not allowed, then the AMF checks whether the SMS over NAS subscription is changed from SMS over NAS is allowed to SMS over NAS is not allowed. After determining the SMS over NAS subscription is changed from SMS over NAS is allowed to SMS over NAS is not allowed, then the AMF sends a first NAS message (e.g. Configuration Update Command) including an Information Element (IE) indicating that the SMS over NAS is not allowed. The AMF optionally include, another Information Element indicating UE to send a second NAS message (e.g. Configuration Update Complete) in response of receiving the first NAS message. When the UE receives the first NAS message containing an IE indicating the SMS over NAS service is not allowed then the UE then the UE stores this information. The UE does not send any SMS over NAS. The AMF deactivates the SMS service in SMSF. The SMSF in turn deregister itself in the UDM for SMS over NAS service for the UE. The SMSF removes the UE context.

Figure 4:
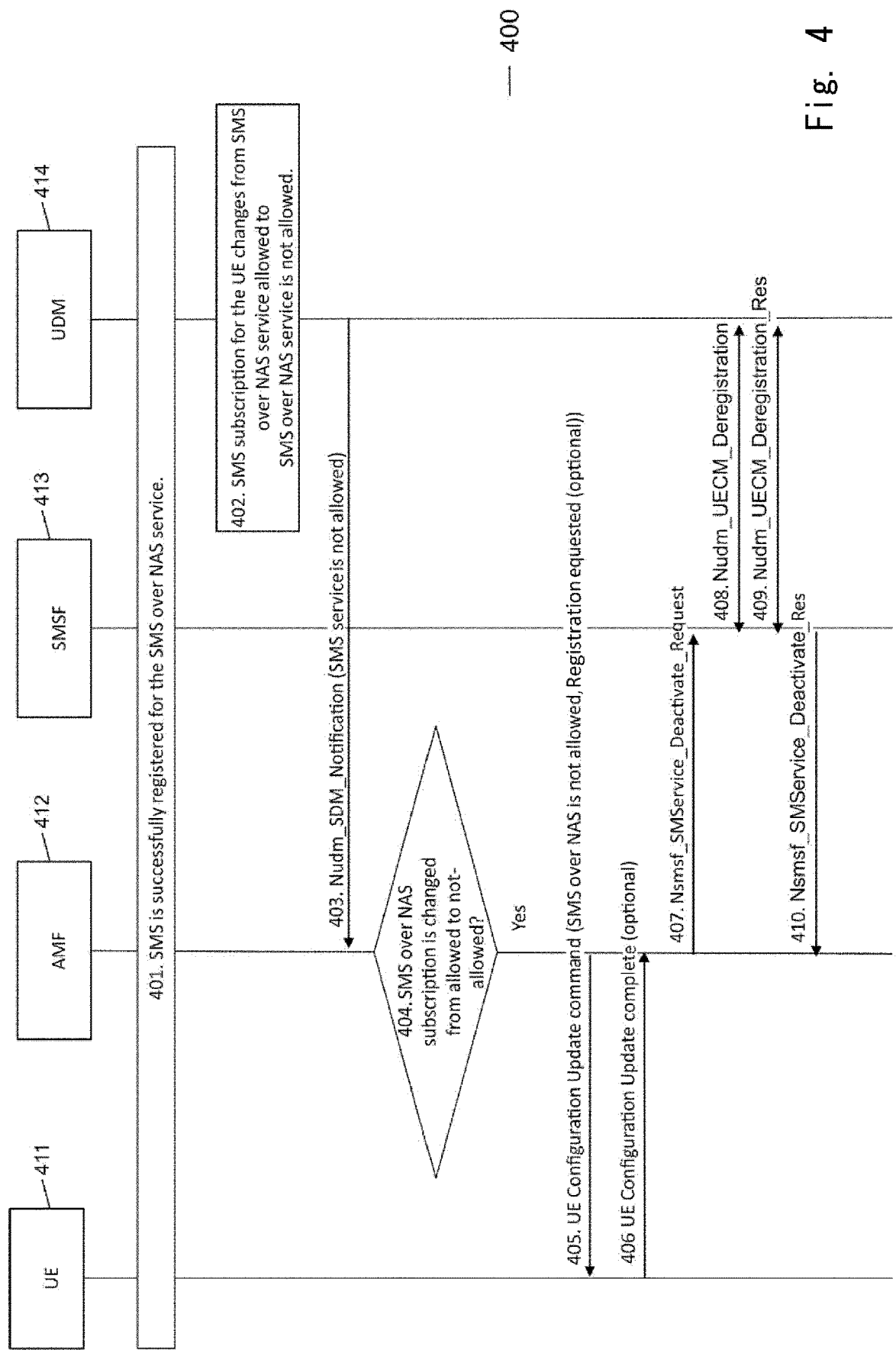
FIG. 4 illustrates a procedure to indicate the SMS over NAS service is not allowed in accordance with the present disclosure.

In an embodiment of the present disclosure as shown in FIG. 4, the procedure to indicate the SMS over NAS service is not allowed is shown. At (401), the UE (411) is registered for the SMS over NAS service in the network and the AMF (412) has UE subscription indicating SMS over NAS service is allowed. As shown at (402 and 403), the SMS over NAS subscription in the UDM/UDR (414) for the UE is changed from SMS over NAS is allowed to SMS over NAS is not allowed. The UDM notifies to the AMF that UE is not allowed, for SMS over NAS service by invoking service Nudm_SDM_Notification. At (404), upon receiving the notification from the UDM that SMS over NAS service is not allowed then the AMF checks whether the SMS over NAS subscription is changed from SMS over NAS is allowed to SMS over NAS is not allowed. At (405), after determining the SMS over NAS subscription is changed from SMS over NAS is allowed to SMS over NAS is not allowed then the AMF (412) sends a first NAS message (e.g. Configuration Update Command) including an Information Element (IE) indicating that the SMS over NAS is not allowed if the UE is in CM-CONNECTED state in the AMF. The AMF optionally includes another Information Element indicating UE to send a second NAS message (e.g. Configuration Update Complete) in response of receiving the first NAS message. The AMF optionally includes another IE to initiate Registration procedure after receiving the first NAS message. If the UE is not in CM-CONNECTED state in the AMF then the AMF initiates network initiated service request procedure and then send the first NAS message to the UE as described above in this step. At (406), when the UE receives the first NAS message containing an IE indicating the SMS over NAS service is not allowed then the UE stores this information. The UE does not send any SMS over NAS, i.e. the UE stops any SMS over NAS. When the first NAS message contains the IE indicating UE to response message of the first NAS message, the UE transmits a second NAS message (e.g. Configuration Update complete) to the AMF. If the first NAS message includes an IE requesting the UE to perform registration procedure, then the UE initiated registration procedure after the UE configuration update procedure is finished. At (407), the AMF sends Nsmsf_SMService_Deactivate to the SMSF to release of UE Context for SMS on SMSF based on local configurations. AMF may delete or deactivate the stored SMSF address in its UE Context and at (408), the SMSF (403) sends Nudm_UECM_Deregistration (SUPI) to UDM to delete SMSF address of the UE. At (409), the UDM sends Nudm_UECM_Deregistration_Res to SMSF and at (410), the SMSF (413) sends Nsmsf_SMService_Deactivate_Res to the AMF. It is to be noted that the procedure as shown in (407 to 410) can be executed before the procedure as shown in (405 and 406).

After completion of the procedure step as shown from (401 to 410), the UE is unable to have the SMS over NAS service i.e. the UE ends the SMS over NAS service.

Figure 5:
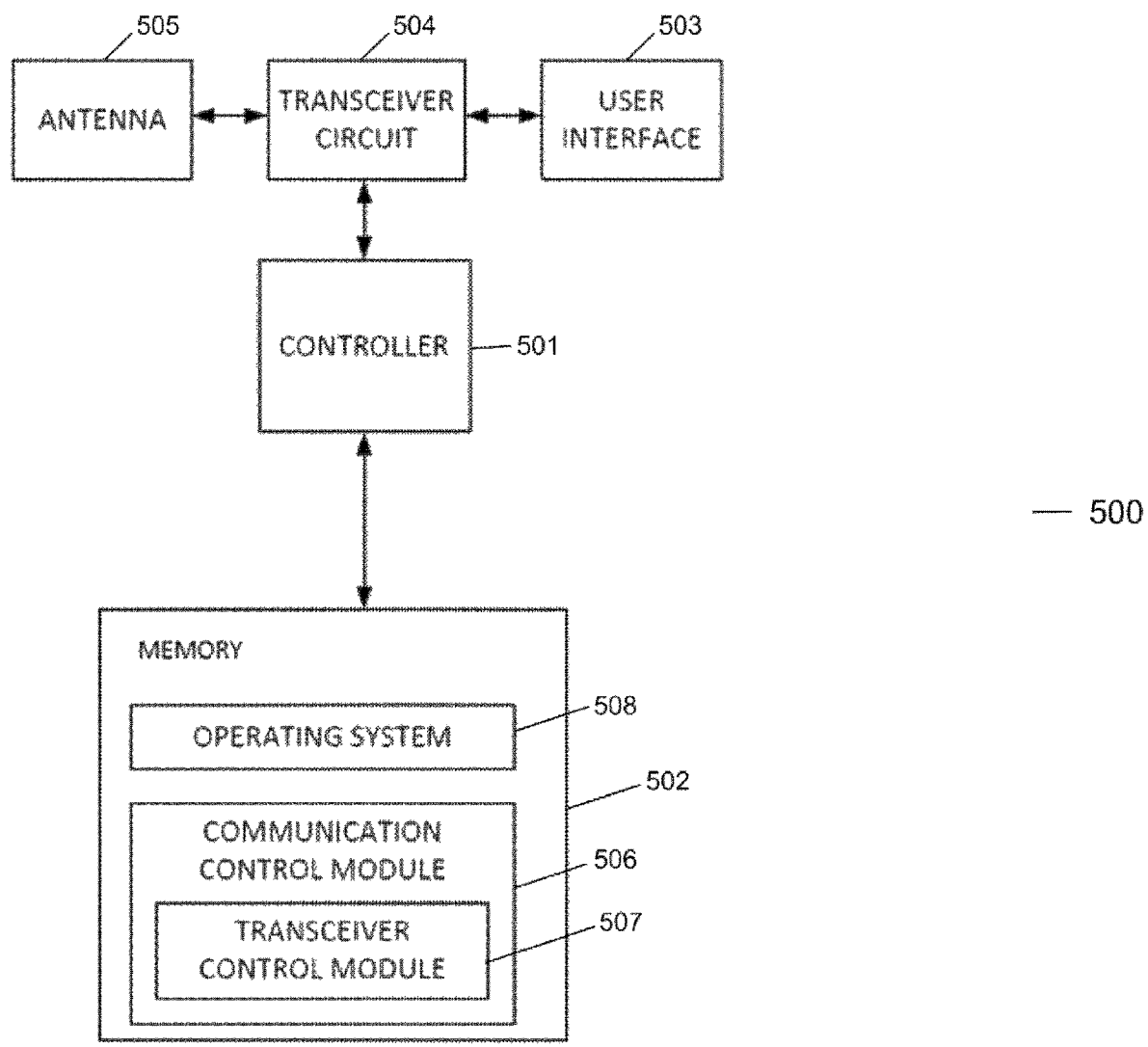
FIG. 5 illustrates general block diagram for UE in accordance with the present disclosure.

FIG. 5 is a block diagram illustrating the main components of an exemplary User Equipment (500)

As shown, the UE (500) includes a transceiver circuit (504) which is operable to transmit signals to and to receive signals from the connected node(s) via one or more antenna (505). Although not necessarily shown in FIG. 5, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller controls (501) the operation of the UE in accordance with software stored in a memory (502). The software includes, among other things, an operating system and a communications control module (506) having at least a transceiver control module (507). The communications control module (506) (using its transceiver control sub-module) is responsible for handling (generating/sending/receiving) signalling and uplink/downlink data packets between the UE and other nodes, such as the base station/(R)AN node, the AMF (and other core network nodes). Such signalling may include, for example, appropriately formatted signalling messages relating to connection establishment and maintenance (e.g. RRC connection establishment and other RRC messages), periodic location update related messages (e.g. tracking area update, paging area updates, location area update) etc. Such signalling may also include, for example, broadcast information (e.g. Master Information and System information) in a receiving case.

The term "UE" is generally intended to be synonymous with the term mobile station, mobile device, wireless device, and includes standalone mobile stations, such as terminals, cell phones, smart phones, tablets, cellular IoT devices, IoT devices, machinery. The term "UE" is also UE that is used by 3GPP.

A UE may be an equipment for production, energy related machinery (such as boilers, engines, turbines, solar panel, wind turbines, hydroelectric generator, thermal power generator, nuclear electricity generator, batteries, nuclear systems and equipment, heavy electrical machinery, pumps, compressors, vacuum pumps, fans, blowers, oil hydraulic equipment, pneumatic equipment, metal working machinery, manipulators, robots and their application systems, tools, molds and dies, rolls, conveying, elevating, materials handling equipment and their application systems, textile machinery, sewing machine, printing and related machinery, paper converting machinery, chemical machinery, mining and construction machinery and equipment, machinery and implements for agriculture, forestry and fisheries, safety and environment preservation equipment, tractor, construction machine, precision bearings, chains, gear, power transmission, lubricating equipment, valve, pipe fitting, etc.

A UE may be a transport equipment (such as rolling stocks, motor vehicle, motor cycle, bicycle, train, bus, carts, rickshaw, ship and watercraft, aircraft, rocket, satellite, drone, balloon, etc.).

Alternatively, A UE may be an information and communication equipment (such as electronic computer and related equipment, communication and related equipment, electronic component, etc.).

Alternatively, A UE may be a refrigerating machine, a refrigerating machine applied product, trade and service industry equipment, vending machine, automatic service machine, office machine and equipment, consumer electronic and electronic appliance (such as audio equipment, video equipment, loud speaker, radio, television, microwave oven, rice cooker, coffee machine, dishwasher, washing machine, dryer, electronic fans and related appliance, cleaner, etc.).

A UE may be an electrical application system (such as x-ray system, particle accelerator, radio isotope equipment, sonic equipment, electromagnetic application equipment, electronic power application equipment, etc.).

A UE may be an electronic lamp, luminaire, measuring instrument, analyzer, tester and surveying instrument (such as smoke alarm, human alarm sensor, motion sensor, wireless tag, etc.), watches and clock, laboratory instrument, optical apparatus, medical equipment and system, weapon, cutlery, hand tool.

A UE may be a wireless-equipped personal digital assistants (such as wireless cards or modules that are designed for attachment to or insertion into another electronic device (for example a personal computer, electrical measuring machine).

A UE may be a device or a part of system that provides applications, services, and solutions described below, as to "internet of things (IoT)", using a variety of wired and/or wireless communication technologies.

Applications, services, and solutions may be MVNO (Mobile Virtual Network Operator) service, emergency radio communication system, PBX (Private Branch eXchange) system, PHS/Digital Cordless Telecommunications system, POS system, advertise calling system, MBMS (Multimedia Broadcast and Multicast Service), V2X (Vehicle to Everything) system, train radio system, location related service.

Disaster/Emergency Wireless Communication Service, community service, video streaming service, femto cell application service, VoLTE service, charging service, radio on demand service, roaming service, activity monitoring service, telecom carrier/communication NW selection service, functional restriction service, PoC (Proof of Concept) service, personal information management service, ad hoc network/DTN (Delay Tolerant Networking) service, etc.

Further, the above-described UE are merely examples of applications of the technical ideas and these technical ideas are not limited to the above-described UE and various modifications can be made thereto.

Figure 6:
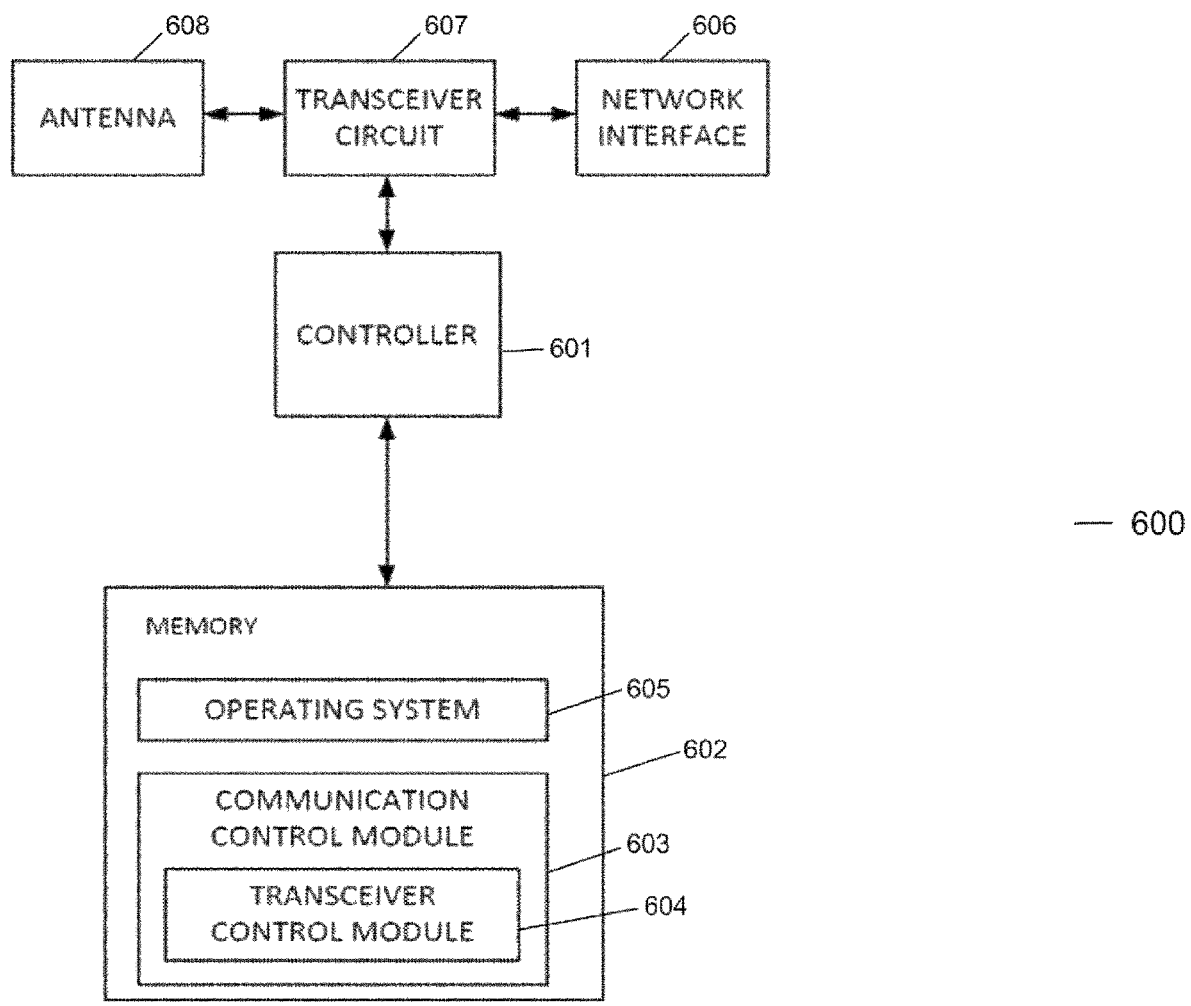
FIG. 6 illustrates general block diagram for (R)AN in accordance with the present disclosure.

FIG. 6 is a block diagram illustrating the main components of an exemplary (R)AN node (600), for example a base station ('eNB' in LTE, 'gNB' in 5G). As shown, the (R)AN node (600) includes a transceiver circuit (607) which is operable to transmit signals to and to receive signals from connected UE(s) via one or more antenna (608) and to transmit signals to and to receive signals from other network nodes (either directly or indirectly) via a network interface. A controller (601) controls the operation of the (R)AN node in accordance with software stored in a memory (602). Software may be pre-installed in the memory and/or may be downloaded via the telecommunication network or from a removable data storage device (RMD), for example. The software includes, among other things, an operating system and a communications control module (603) having at least a transceiver control module (604).

The communications control module (603) (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

Figure 7:
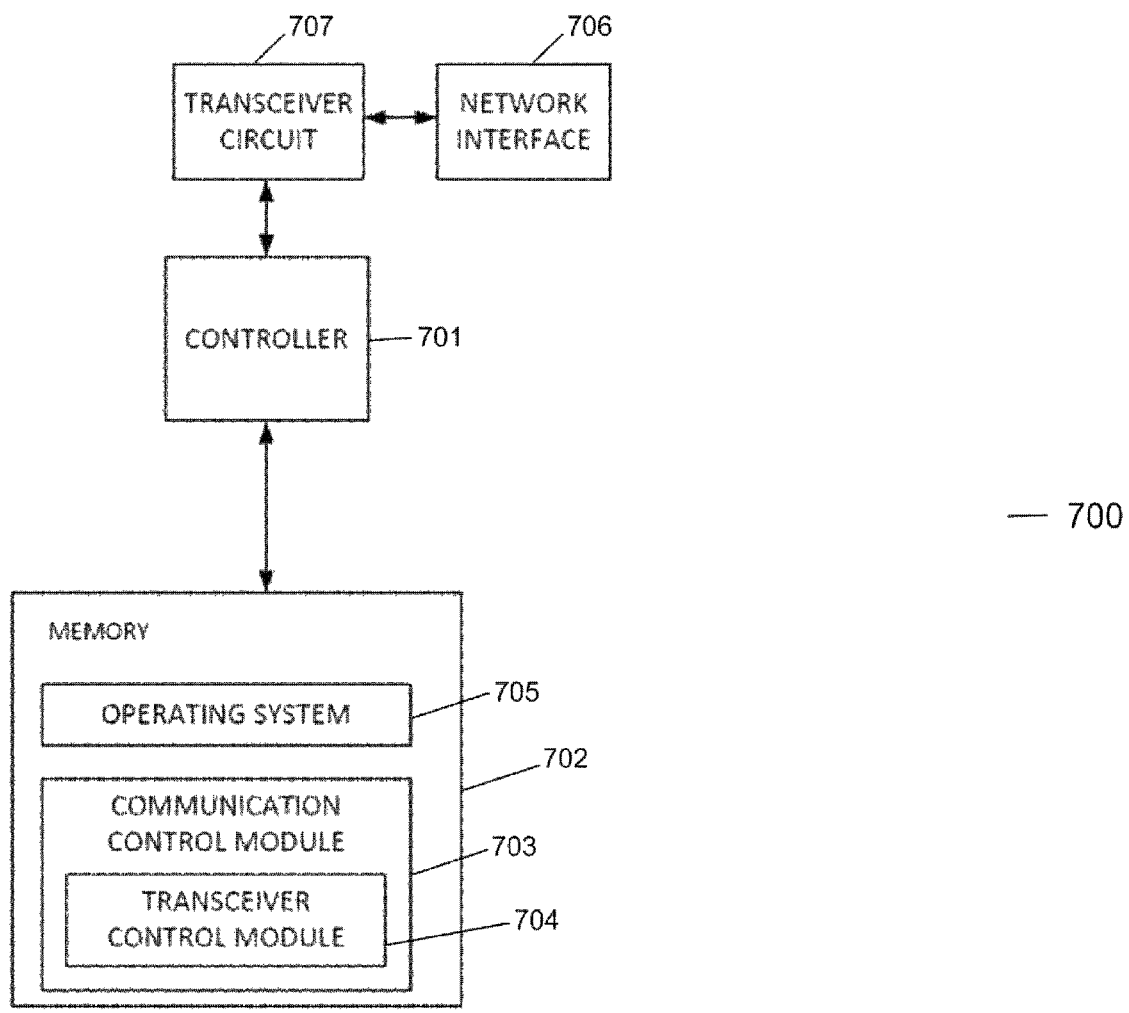
FIG. 7 illustrates general block diagram for AMF in accordance with the present disclosure.

FIG. 7 is a block diagram illustrating the main components of the AMF (700). The AMF is included in the 5GC. As shown, the AMF (700) includes a transceiver circuit (707) which is operable to transmit signals to and to receive signals from other nodes (including the UE) via a network interface. A controller (701) controls the operation of the AMF (700) in accordance with software stored in a memory. Software may be pre-installed in the memory and/or may be downloaded via the telecommunication network or from a removable data storage device (RMD), for example. The software includes, among other things, an operating system and a communications control module (703) having at least a transceiver control module (704).

The communications control module (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

As will be appreciated by one of skill in the art, the present disclosure may be embodied as a method, and system. Accordingly, the present disclosure may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

Abbreviations

For the purposes of the present disclosure, the following abbreviations apply.

5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
CM Connection Management
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GMSC Gateway Mobile Services Switching Center
GPSI Generic Public Subscription Identifier
GUAMI Globally Unique AMF Identifier
HR Home Routed (roaming)
I-RNTI I-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
MNRF Mobile Station Not Reachable Flag
MO Mobile Originated
MT Mobile Terminated
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
SMS Short Message Service
SMSF SMS Function
S-NSSAI Single Network Slice Selection Assistance Information
SSC Session and Service Continuity
SST Slice/Service Type
SUCI Subscription Concealed Identifier
SUPI Subscription Permanent Identifier
UDM Unified Data Management
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function This application is based upon and claims the benefit of priority from Indian patent applications No. 201811023633, filed on Jun. 25, 2018, the disclosure of which is incorporated herein in its entirety by reference.

REFERENCE SIGNS LIST

500 UE
501 controller
502 memory
503 user interface
504 transceiver circuit
505 antenna
506 communication control module
507 transceiver control module 508 operating system
600 (R)AN node
601 controller
602 memory
603 communications control module
604 transceiver control module
605 operating system
606 network interface
607 transceiver circuit
608 antenna
700 AMF
701 controller
702 memory
703 communications control module
704 transceiver control module
705 operating system
706 network interface
707 transceiver circuit

The invention claimed is:

1. A method for a User Equipment (UE), the method comprising:
receiving a Configuration Update Command message from an Access and mobility Management Function (AMF);
determining that the Configuration Update Command message includes:
acknowledgement indication, and
Short Message Service (SMS) indication;
sending a Configuration Update Complete message to the AMF, based on the determining that the Configuration Update Command message includes the acknowledgement indication; and
sending, to the AMF, a registration request message to perform a registration procedure based on the SMS indication indicating that the UE is available for SMS over Non-Access Stratum (NAS) and after a completion of a configuration update procedure.

2. A method for an Access and mobility Management Function (AMF), the method comprising:
sending a Configuration Update Command message to a User Equipment (UE), the Configuration Update Command message including:
acknowledgement indication, and
Short Message Service (SMS) indication);
receiving a Configuration Update Complete message from the UE, wherein
the SMS indication is included in the Configuration Update Command message based on an ability for the UE to use SMS over Non-Access Stratum (NAS) having changed; and
receiving, from the UE, a registration request message to perform a registration procedure based on the SMS indication indicating that the UE is available for the SMS over NAS and after a completion of a configuration update procedure.

3. The method according to claim 2, further comprising accepting use of the SMS over NAS by the UE based on the SMS indication indicating that the UE is available for the SMS over NAS.

4. The method according to claim 1, wherein the acknowledgment indication indicates that acknowledgement for the Configuration Update Command message is requested to the UE.

5. The method according to claim 1, wherein the SMS indication indicates an ability for the UE to use SMS over NAS having changed.

6. The method according to claim 2, wherein the acknowledgment indication indicates that acknowledgement for the Configuration Update Command message is requested to the UE.

7. The method according to claim 2, wherein the SMS indication indicates the ability for the UE to use SMS over NAS having changed.

* * * * *